United States Patent
Kim

(10) Patent No.: US 9,184,466 B2
(45) Date of Patent: Nov. 10, 2015

(54) ELECTROLYTE FOR RECHARGEABLE LITHIUM BATTERY, AND RECHARGEABLE LITHIUM BATTERY INCLUDING THE SAME

(75) Inventor: Seung-Mo Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 803 days.

(21) Appl. No.: 13/363,271

(22) Filed: Jan. 31, 2012

(65) Prior Publication Data

US 2012/0237836 A1    Sep. 20, 2012

Related U.S. Application Data

(60) Provisional application No. 61/452,512, filed on Mar. 14, 2011.

(51) Int. Cl.
```
H01M 6/16       (2006.01)
H01M 10/0567    (2010.01)
H01M 10/0525    (2010.01)
H01M 10/0568    (2010.01)
H01M 10/0569    (2010.01)
```

(52) U.S. Cl.
CPC ...... *H01M 10/0567* (2013.01); *H01M 10/0525* (2013.01); *H01M 10/0568* (2013.01); *H01M 10/0569* (2013.01); *Y02E 60/122* (2013.01); *Y02T 10/7011* (2013.01)

(58) Field of Classification Search
USPC ................ 429/326, 324, 330, 331, 337, 332
IPC ........................ H01M 6/16,6/168, 6/166, 10/05
See application file for complete search history.

(56) References Cited

U.S. PATENT DOCUMENTS

| | | | |
|---|---|---|---|
| 6,787,269 B2 | 9/2004 | Sekino et al. | |
| 7,455,935 B2 * | 11/2008 | Abe et al. | 429/337 |
| 2005/0019670 A1 | 1/2005 | Amine et al. | |
| 2005/0100786 A1 | 5/2005 | Ryu et al. | |
| 2006/0134527 A1 | 6/2006 | Amine et al. | |

FOREIGN PATENT DOCUMENTS

| | | |
|---|---|---|
| EP | 2 437 340 A1 | 4/2012 |
| JP | 2009-176534 A | 8/2009 |
| KR | 10-2002-0025677 | 4/2002 |
| KR | 10-2005-0028895 | 3/2005 |
| KR | 10-2007-0110502 A | 11/2007 |
| KR | 10-2009-0039211 A | 4/2009 |
| WO | WO 2010/137571 A1 | 12/2010 |

OTHER PUBLICATIONS

European Search Report dated Jul. 12, 2012, for corresponding European Patent application 12158494.0, (7 pages).

* cited by examiner

*Primary Examiner* — Patrick Ryan
*Assistant Examiner* — Julian Anthony
(74) *Attorney, Agent, or Firm* — Christie, Parker & Hale, LLP

(57) ABSTRACT

An electrolyte for a rechargeable lithium battery includes a first lithium salt; a second lithium salt including a compound represented by Chemical Formula 1, Chemical Formula 3-1 or 3-2, or combinations thereof; a non-aqueous organic solvent; and an additive including a compound represented by Chemical Formula 9.

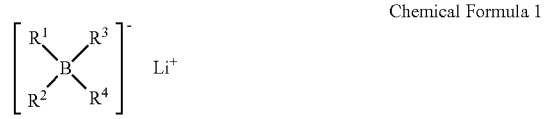

Chemical Formula 1

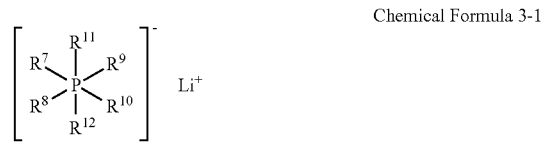

Chemical Formula 3-1

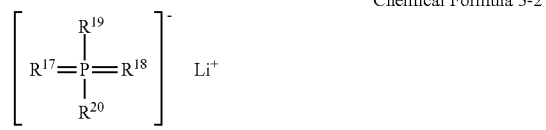

Chemical Formula 3-2

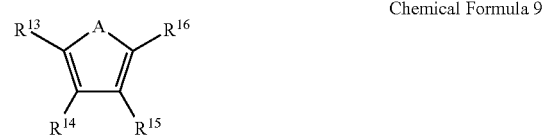

Chemical Formula 9

20 Claims, 3 Drawing Sheets

ELECTROLYTE FOR RECHARGEABLE LITHIUM BATTERY, AND RECHARGEABLE LITHIUM BATTERY INCLUDING THE SAME

CROSS-REFERENCE TO RELATED APPLICATIONS

This application claims priority to and the benefit of U.S. Provisional Application No. 61/452,512, filed in the United States Patent and Trademark Office on Mar. 14, 2011, the entire contents of which are incorporated herein by reference.

BACKGROUND

1. Field

This disclosure relates to an electrolyte for a rechargeable lithium battery and a rechargeable lithium battery including the same.

2. Description of the Related Art

Rechargeable lithium batteries have recently drawn attention as power sources for small, portable electronic devices. They use organic electrolyte solutions and therefore have twice the discharge voltage of conventional batteries using alkaline aqueous solutions. Accordingly, they have high energy density.

Rechargeable lithium batteries include positive electrodes including positive active materials that can intercalate and deintercalate lithium, and negative electrodes including active materials that can intercalate and deintercalate lithium. Organic electrolyte solutions are then injected into a battery cell including the positive and negative electrodes to complete the lithium batteries.

Recently, rechargeable lithium batteries have drawn attention as power sources for hybrid electric vehicles (HEV) and electric vehicles (EV), as the demand for environmentally-friendly electric vehicles has increased. Batteries for electric vehicles should have high power output at room temperature and low temperature and good characteristics at high temperature.

SUMMARY

According to embodiments of the present invention, an electrolyte for a rechargeable lithium battery has improved output characteristics at high temperatures and after standing at high temperatures, as well as at room temperature and low temperatures.

Another embodiment of the present invention provides a rechargeable lithium battery including the electrolyte.

According to embodiments of the present invention, an electrolyte for a rechargeable lithium battery includes a first lithium salt; a second lithium salt including a compound represented by Chemical Formula 1, another compound represented by Chemical Formula 3-1 or 3-2, or combinations thereof; a non-aqueous organic solvent; and an additive including a compound represented by Chemical Formula 9.

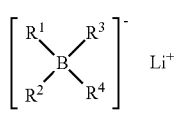

Chemical Formula 1

In Chemical Formula 1, $R^1$ and $R^2$ are optionally linked by a moiety represented by Chemical Formula 2 to form a ring, and when $R^1$ and $R^2$ are not linked by the moiety represented by Chemical Formula 2, each of $R^1$ and $R^2$ is F. $R^3$ and $R^4$ are linked by a moiety represented by Chemical Formula 2 to form a ring.

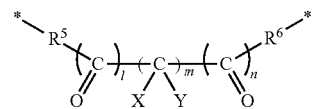

Chemical Formula 2

In Chemical Formula 2, each of $R^5$ and $R^6$ is independently O or S, each of X and Y is independently H or F, each of l and n is independently 0 or 1, and m is an integer ranging from 0 to 5.

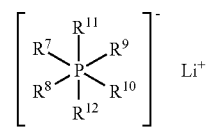

Chemical Formula 3-1

In Chemical Formula 3-1, $R^7$ and $R^8$ are optionally linked by a moiety represented by Chemical Formula 2 to form a ring, and when $R^7$ and $R^8$ are not linked by the moiety represented by Chemical Formula 2, each of $R^7$ and $R^8$ is F. $R^9$ and $R^{10}$ are linked by a moiety represented by Chemical Formula 2 to form a ring, and each of $R^{11}$ and $R^{12}$ is F.

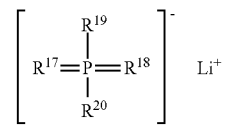

Chemical Formula 3-2

In Chemical Formula 3-2, each of $R^{17}$ and $R^{18}$ is independently selected from O, S, and NR', wherein R' is selected from substituted C1 to C5 alkyl groups and unsubstituted C1 to C5 alkyl groups. Each of $R^{19}$ and $R^{20}$ is F.

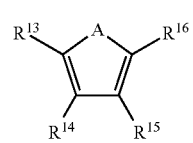

Chemical Formula 9

In Chemical Formula 9, A is selected from S, O, and NR'', where R'' is selected from H, substituted C1 to C20 alkyl groups, and unsubstituted C1 to C20 alkyl groups. Each of $R^{13}$ to $R^{16}$ is independently selected from H, halogens, substituted C1 to C20 alkyl groups, unsubstituted C1 to C20 alkyl groups, substituted C1 to C20 alkoxy groups, and unsubstituted C1 to C20 alkoxy groups. $R^{14}$ and $R^{15}$ may optionally be linked to each other to form a ring.

In some embodiments, the second lithium salt may include at least one compound represented by Chemical Formulae 4 and 5.

Chemical Formula 4

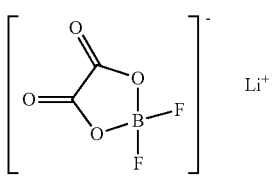

Chemical Formula 5

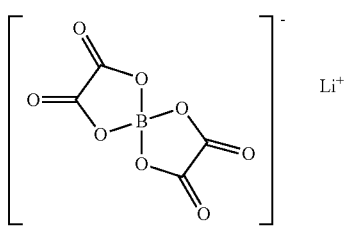

In other embodiments, the second lithium salt may include at least one compound represented by Chemical Formulae 6 to 8.

Chemical Formula 6

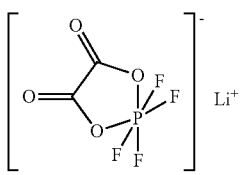

Chemical Formula 7

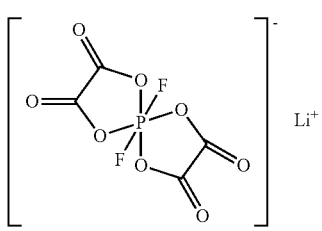

Chemical Formula 8

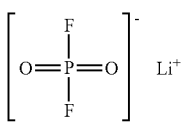

In some embodiments, the additive may include at least one of the compounds represented by Chemical Formulae 10 to 13.

Chemical Formula 10

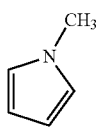

Chemical Formula 11

Chemical Formula 12

Chemical Formula 13

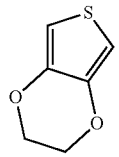

The second lithium salt may be included at about 0.1 to about 10 wt % based on the total weight of the electrolyte. In some embodiments, the second lithium salt may be included at about 0.5 to about 1.5 wt % based on the total weight of the electrolyte.

In some embodiments, the weight ratio of the first lithium salt to the second lithium salt is about 1:9 to about 9:1.

The additive may be present at from about 0.005 to about 3 wt % based on the total weight of the electrolyte. In some embodiments, the additive may be present at from about 0.03 to about 0.1 wt % based on the total weight of the electrolyte.

The first lithium salt may include $LiPF_6$, $LiBF_4$, $LiSbF_6$, $LiAsF_6$, $LiSO_3CF_3$, $LiN(CF_3SO_2)_2$, $LiN(C_2F_5SO_2)_2$, $LiClO_4$, $LiAlO_2$, $LiAlCl_4$, or combinations thereof.

The non-aqueous organic solvent may include linear carbonate compounds, cyclic carbonate compounds, ester-based compounds, ether-based compounds, ketone-based compounds, or combinations thereof.

In some embodiments, the weight ratio of the additive to the second lithium salt is about 0.005:1 to about 1:1.

According to other embodiments of the present invention, a rechargeable lithium battery includes a positive electrode including a positive active material; a negative electrode including a negative active material; and the electrolyte.

The positive active material may include at least one lithium metal oxide represented by Chemical Formulae 14 to 16.

$$Li_xMO_2, \quad \text{Chemical Formula 14}$$

wherein M is at least one transition element, and $0 \leq x \leq 1$ $$Li_yM_2O_4, \quad \text{Chemical Formula 15}$$

wherein M is at least one transition element, and, $0 \leq y \leq 2$)

$$x(Li_2MnO_3).(1-x)(LiMn_{2-y}M_yO_4), \quad \text{Chemical Formula 16}$$

wherein M is at least one transition element, $0 < x < 1$, and $0 \leq y < 1$

The negative active material may include carbon-based active materials, Si-based active materials, or combinations thereof.

A rechargeable lithium battery having the electrolyte may have improved cycle-life during cycling at high temperatures and after standing at high temperatures as well as good output characteristics at room temperature and low temperatures.

DETAILED DESCRIPTION

Figure 1:
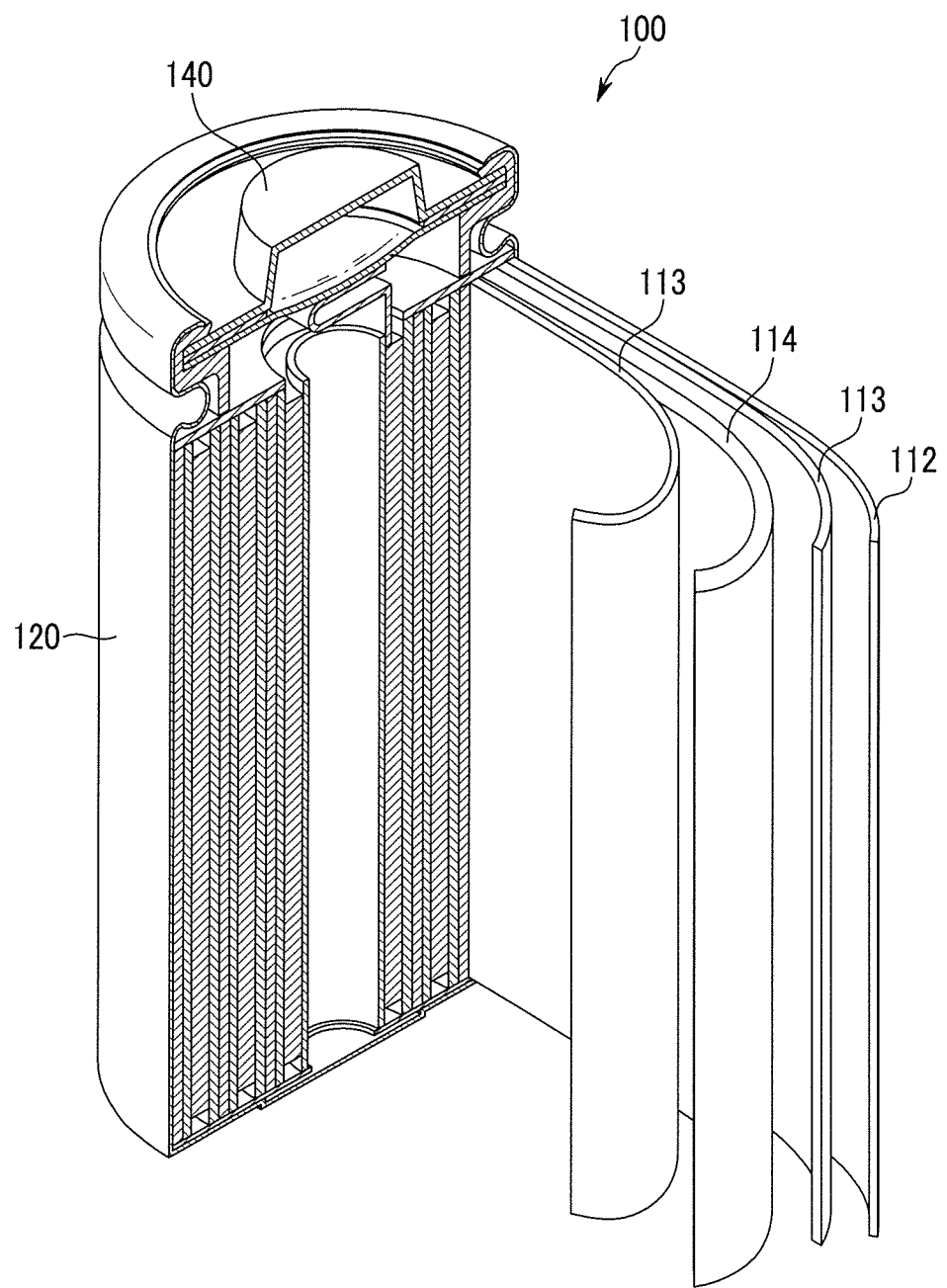
FIG. 1 is a schematic view of a rechargeable lithium battery according to an embodiment of the present invention.

Exemplary embodiments will hereinafter be described. However, these embodiments are only exemplary, and the present invention is not limited thereto.

According to embodiments of the present invention, an electrolyte for a rechargeable lithium battery includes a lithium salt, a non-aqueous organic solvent, and an additive.

The lithium salt supplies lithium ions in the battery and improves lithium ion transportation between the positive and negative electrodes. The lithium salt includes a mixture of first and second lithium salts. The first lithium salt may include $LiPF_6$, $LiBF_4$, $LiSbF_6$, $LiAsF_6$, $LiSO_3CF_3$, $LiN(CF_3SO_2)_2$, $LiN(C_2F_5SO_2)_2$, $LiClO_4$, $LiAlO_2$, $LiAlCl_4$, or combinations thereof. The second lithium salt may include a compound represented by Chemical Formula 1, a compound represented by Chemical Formula 3-1 or 3-2, or combinations thereof.

Chemical Formula 1

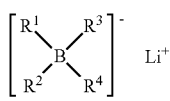

In Chemical Formula 1, $R^1$ and $R^2$ are optionally linked by a moiety represented by Chemical Formula 2 to form a ring, and when $R^1$ and $R^2$ are not linked by the moiety represented by Chemical Formula 2, each of $R^1$ and $R^2$ is F. $R^3$ and $R^4$ are linked by a moiety represented by Chemical Formula 2 to form a ring.

Chemical Formula 2

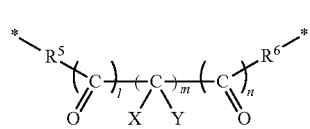

In Chemical Formula 2, each of $R^5$ and $R^6$ is independently O or S, each of X and Y is independently H or F, each of l and n is independently 0 or 1, and m is an integer ranging from 0 to 5.

Chemical Formula 3-1

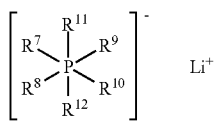

In Chemical Formula 3-1, $R^7$ and $R^8$ are optionally linked by a moiety represented by Chemical Formula 2 to form a ring, and when $R^7$ and $R^8$ are not linked by the moiety represented by Chemical Formula 2, each of $R^7$ and $R^8$ is F. $R^9$ and $R^{10}$ are linked by a moiety represented by Chemical Formula 2 to form a ring, and each of $R^{11}$ and $R^{12}$ is F.

Chemical Formula 3-2

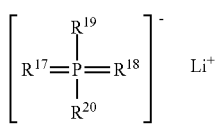

In Chemical Formula 3-2, each of $R^{17}$ and $R^{18}$ is independently selected from O, S, and NR', wherein R' is selected from substituted C1 to C5 alkyl groups and unsubstituted C1 to C5 alkyl groups. Each of $R^{19}$ and $R^{20}$ is F.

The second lithium salt may in particular include at least one of the compounds represented by Chemical Formulae 4 to 8, however, any suitable second lithium salt may be used.

Chemical Formula 4

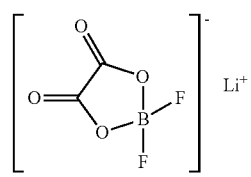

Chemical Formula 5

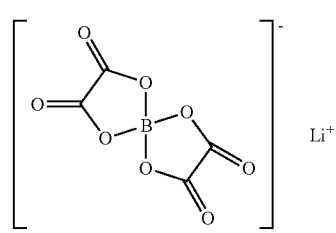

Chemical Formula 6

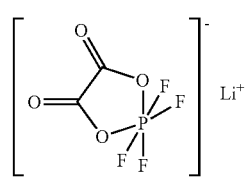

Chemical Formula 7

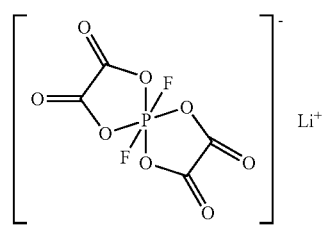

Chemical Formula 8

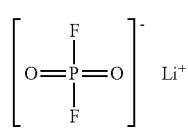

In rechargeable lithium batteries, during initial charging, lithium is oxidized from, for example, lithium metal oxide into lithium ions at the positive electrode, and the lithium ions are intercalated with, for example, carbon at the negative electrode. Lithium ions are strongly reactive and reduce the electrolyte on the interface of the negative electrode and form a layer on the surface of the negative electrode. The layer is called a solid electrolyte interface (SEI).

The SEI layer prevents or reduces the reaction of the negative electrode with the electrolyte during charge and discharge and simultaneously passes lithium ions moving from the positive electrode to the negative electrode, functioning as an ion tunnel. Accordingly, lithium ions in the electrolyte are intercalated with carbon at the negative electrode, and thus, structural collapse of the negative electrode is prevented or reduced. As such, when the second lithium salt is added to the electrolyte, an improved layer having improved output characteristics at room temperature and low temperatures may be formed on the surface of the negative electrode surface.

In particular, the second lithium salt includes a negative ion including a hetero atom or a halogen atom having a coordination bond with boron (B) and/or phosphorous (P) atoms, and a positive lithium ion. When the second lithium salt is added to the electrolyte, it is reduced at a lower potential than the non-aqueous organic solvent and thus, the output characteristics of the lithium rechargeable battery at room temperature and low temperatures is improved.

The second lithium salt may be included at about 0.1 to about 10 wt % based on the total weight of the electrolyte. In some embodiments, the second lithium salt may be present in an amount of from about 0.5 to about 1.5 wt % based on the total weight of the electrolyte. When the second lithium salt is included within these ranges, the rechargeable lithium battery may have improved output characteristics at room temperature and low temperatures.

In addition, the first lithium salt and the second lithium salt may be mixed in a weight ratio ranging from about 1:9 to about 9:1.

The additive may include a compound represented by Chemical Formula 9.

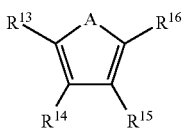

Chemical Formula 9

In Chemical Formula 9, A is selected from S, O, and NR'', where R'' is selected from H, substituted C1 to C20 alkyl groups, and unsubstituted C1 to C20 alkyl groups. Each of $R^{13}$ to $R^{16}$ is independently selected from H, halogens, substituted C1 to C20 alkyl groups, unsubstituted C1 to C20 alkyl groups, and substituted C1 to C20 alkoxy groups. $R^{14}$ and $R^{15}$ may optionally be linked to each other to form a ring.

The compound of Chemical Formula 9 may be at least one compound represented by Chemical Formulae 10 to 13, however, any suitable additive may be used.

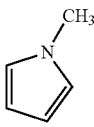

Chemical Formula 10

Chemical Formula 11

Chemical Formula 12

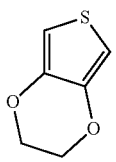

Chemical Formula 13

When the second lithium salt is included in the electrolyte, a lithium rechargeable battery may have improved output characteristics at room temperature and low temperatures. However, capacity may deteriorate during cycling at high temperatures and when allowed to stand at high temperatures. Capacity deterioration may occur when a layer on the surface of the negative electrode reacts with intercalated lithium ions, when the residue of the second lithium salt is oxidized at the positive electrode during charge and discharge at high temperatures, or when both of these situations occur.

The additive is a π-bond-conjugated monomer and is P-doped with positive charge and thus, forms a conductive polymer layer. Accordingly, since the conductive polymer layer prevents oxidation of the electrolyte at high temperatures or high voltage, the electrolyte including the additive may improve the cycle-life of the lithium rechargeable battery during cycling at high temperatures and when allowed to stand at high temperatures.

The additive may be included at about 0.005 to about 3 wt % based on the total weight of the electrolyte. In some embodiments, the additive may be present in an amount of about 0.03 to about 0.1 wt % based on the total weight of the electrolyte. When the additive is included within the range, the electrolyte may improve the cycle-life of the lithium rechargeable battery during cycling at high temperatures and when allowed to stand at high temperatures.

The compound represented by Chemical Formula 9 and the second lithium salt may be mixed in a weight ratio of from about 0.005:1 to about 1:1. For example, in some embodiments, the compound represented by Chemical Formula 9 and the second lithium salt may be mixed in a weight ratio of from about 0.03:1 to about 0.6:1. In some embodiments, the compound represented by Chemical Formula 9 and the second lithium salt may be mixed in a weight ratio of from about 0.05:1 to about 0.3:1.

The non-aqueous organic solvent acts as a medium for transmitting ions taking part in the electrochemical reaction of the battery. The non-aqueous organic solvent may include linear carbonate compounds, cyclic carbonate compounds, ester-based compounds, ether-based compounds, ketone-based compounds, or combinations thereof.

Non-limiting examples of the linear carbonate compounds include diethyl carbonate (DEC), ethylmethyl carbonate (EMC), dimethyl carbonate (DMC), dipropyl carbonate (DPC), methylpropyl carbonate (MPC), ethylpropyl carbonate (EPC), methylethyl carbonate (MEC), or combinations thereof.

Non-limiting examples of the cyclic carbonate compounds include ethylene carbonate (EC), propylene carbonate (PC), butylene carbonate (BC), fluoroethylene carbonate (FEC), vinylethylene carbonate (VEC), or combinations thereof.

The linear carbonate compound may be added at more than about 60 wt % and the cyclic carbonate compound may be added at less than about 40 wt % based on the total weight of the non-aqueous organic solvent. Within the above range, the solvent may simultaneously have a high dielectric constant and low viscosity.

Non-limiting examples of the ester-based compounds include methylacetate, ethylacetate, n-propylacetate, dimethylacetate, methylpropionate, ethylpropionate, γ-butyrolactone, decanolide, valerolactone, mevalonolactone, caprolactone, and the like.

Non-limiting examples of the ether-based compounds include dibutylether, tetraglyme, diglyme, dimethoxyethane, 2-methyltetrahydrofuran, tetrahydrofuran, and the like.

Non-limiting examples of the ketone-based compounds include cyclohexanone and the like.

The non-aqueous organic solvent may further include alcohol-based compounds, aprotic solvents, and the like. Non-limiting examples of the alcohol-based compounds include ethanol, isopropyl alcohol, and the like. Non-limiting examples of the aprotic solvents include nitriles (such as R—CN, where R is a C2 to C20 linear, branched, or cyclic hydrocarbon, a double bond, an aromatic ring, or an ether bond), amides (such as dimethylformamide), dioxolanes (such as 1,3-dioxolane), sulfolanes, and the like.

A single non-aqueous organic solvent may be used or a mixture of solvents may be used. When a mixture of solvents is used, the mixing ratio can be adjusted in accordance with the desired battery performance.

Referring to FIG. 1, the rechargeable lithium battery including the electrolyte according to an embodiment of the present invention is described. FIG. 1 is a schematic view of a rechargeable lithium battery according to one embodiment.

Referring to FIG. 1, the rechargeable lithium battery 100 includes an electrode assembly including a positive electrode 114, a negative electrode 112 facing the positive electrode 114, a separator 113 between the positive electrode 114 and negative electrode 112, and an electrolyte (not shown) impregnating the positive electrode 114, the negative electrode 112, and the separator 113. The rechargeable lithium battery includes a battery case 120 housing the electrode assembly, and a sealing member 140 sealing the battery case 120.

The positive electrode 114 may include a current collector and a positive active material layer on the current collector. The positive active material layer may include a positive active material, a binder, and optionally, a conductive material.

The current collector may be Al but is not limited thereto.

The positive active material may include at least one of the lithium metal oxides represented by Chemical Formulae 14 to 16, however, any positive active material known for use in a rechargeable lithium battery, or any other suitable positive active material, may be used.

   Chemical Formula 14 wherein M is at least one transition element, e.g. Ni, Co, Mn, Al, or combinations thereof, and $0 \leq x \leq 1$

   Chemical Formula 15 wherein M is at least one transition element, e.g., Ni, Co, Mn, Al, or combinations thereof, and $0 \leq y \leq 2$

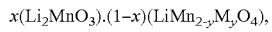   Chemical Formula 16 wherein M is at least one transition element, e.g., Ni, Co, Mn, Al, or combinations thereof, $0 < x < 1$, and $0 \leq y < 1$ The positive active material binder improves binding properties of the positive active material particles to each other and to the current collector. Non-limiting examples of the binder include at least one of polyvinyl alcohol, carboxylmethyl cellulose, hydroxypropyl cellulose, diacetyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidenefluoride, polyethylene, polypropylene, styrene-butadiene rubber, acrylated styrene-butadiene rubber, epoxy resins, nylon, and the like, however, any suitable binder may be used.

The positive active material conductive material improves electrical conductivity of the positive electrode. Any electrically conductive material can be used as a conductive agent so long as it does not cause a chemical change in the battery. Non-limiting examples of the conductive material include carbon-based materials such as natural graphite, artificial graphite, carbon black, acetylene black, ketjen black, carbon fiber; metal-based materials such as metal powders or metal fibers including copper, nickel, aluminum, silver, and the like; conductive polymers such as polyphenylene derivatives and the like; and mixtures thereof.

The negative electrode 112 includes a negative current collector and a negative active material layer disposed thereon. The negative current collector may include a copper foil. The negative active material layer may include a negative active material, a binder, and optionally a conductive material.

The negative active material may include carbon-based active materials, Si-based active materials, or combinations thereof. However, any negative active material suitable for use in a rechargeable lithium battery may be used.

Non-limiting examples of the carbon-based active materials include crystalline carbon, amorphous carbon, or mixtures thereof. Non-limiting examples of the crystalline carbon include non-shaped, or sheet, flake, spherical, or fiber shaped natural graphite or artificial graphite. Non-limiting examples of the amorphous carbon include soft carbon (carbon sintered at low temperatures), hard carbon, mesophase pitch carbonized products, fired coke, and the like.

Non-limiting examples of the Si-based active materials include Si, $SiO_x$ ($0<x<2$), Si—Y alloys (wherein Y is not Si and is selected from alkali metals, alkaline-earth metals, group 13 elements, group 14 elements, transition elements, rare earth elements, and combinations thereof), Sn, $SnO_2$, Sn—Y alloys (wherein Y is not Si and is selected from alkali metals, alkaline-earth metals, group 13 elements, group 14 elements, transition elements, rare earth elements, and combinations thereof), or mixtures thereof. At least one of these materials may be mixed with $SiO_2$. In some embodiments, Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The negative active material binder improves the binding properties of the negative active material particles to each other and to the current collector. Non-limiting examples of the binder include at least one of polyvinyl alcohol, carboxylmethyl cellulose, hydroxypropyl cellulose, diacetyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidenefluoride, polyethylene, polypropylene, styrene-butadiene rubber, acrylated styrene-butadiene rubber, epoxy resins, nylon, and the like, however, any suitable binder may be used.

The negative active material conductive material improves electrical conductivity of the negative electrode. Any electrically conductive material can be used as the conductive agent so long as it does not cause a chemical change in the battery. Non-limiting examples of the conductive material include carbon-based materials such as natural graphite, artificial graphite, carbon black, acetylene black, ketjen black, carbon fiber, and the like; metal-based materials such as metal powders or metal fibers including copper, nickel, aluminum, silver, and the like; conductive polymers such as polyphenylene derivatives, and the like; and mixtures thereof.

The negative and positive electrodes 112 and 114 may be fabricated by mixing the active material, the conductive material, and the binder into an active material composition, and coating the composition on a current collector. The electrode manufacturing method is known to those of ordinary skill in the art.

The separator 113 may be a single layer or multiple layers. The separator 113 may be made of polyethylene, polypropylene, polyvinylidene fluoride, or combinations thereof.

The following examples are presented for illustrative purposes only, and do not limit the scope of the present invention. Furthermore, what is not described in this specification can be sufficiently understood by those who have knowledge in this field.

Preparation of Electrolyte

Examples 1 and 2 snd Comparative Examples 1 To 3

Ethylene carbonate (EC), ethylmethyl carbonate (EMC), and dimethyl carbonate (DMC), were mixed in a weight ratio of 2:4:4. $LiPF_6$ having a concentration of 1.15 M was added to the solution. A lithium salt and an additive were added to each of Examples 1 and 2 and Comparative Examples 1 to 3 according to Table 1, preparing an electrolyte. The lithium salt and the additive were added to each of Examples 1 and 2 and Comparative Examples 1 to 3 at 1 wt % and 0.05 wt %, respectively, based on the total weight of the electrolyte respectively.

TABLE 1

|  | Lithium salt | Additive |
|---|---|---|
| Example 1 | lithium difluoro(oxalato)borate (LiDFOB) | Thiophene |
| Example 2 | LiDFOB | N-methylpyrrole |
| Comparative Example 1 | LiDFOB | — |
| Comparative Example 2 | LiDFOB | Biphenyl |
| Comparative Example 3 | LiDFOB | Succinonitrile |

Fabrication of Rechargeable Lithium Batteries $LiNi_{0.5}Co_{0.2}Mn_{0.3}O_2$ as a positive active material, polyvinylidene fluoride (PVDF) as a binder, and carbon as a conductive material were mixed in a weight ratio of 86:9:5. The mixture was dispersed into N-methyl-2-pyrrolidone to prepare a positive active material composition. The positive active material composition was coated on a 15 μm-thick aluminum foil and then dried and compressed, fabricating a positive electrode.

Modified natural graphite as a negative active material, a binder, and a thickener in a weight ratio of 98:1:1 were mixed in an aqueous system to prepare a negative active material composition. The negative active material composition was coated on a 10 μm-thick copper foil and then dried and compressed, fabricating a negative electrode.

The positive and negative electrodes and a 25 μm-thick polyethylene separator positioned therebetween were wound and compressed together, fabricating an electrode assembly. The electrode assemblies were then placed in a can. The electrolytes prepared according to Examples 1 and 2 and Comparative Examples 1 to 3 were added to separate cans to form rechargeable lithium battery cells.

Experimental Example 1

Cycle-Life Evaluation when the Battery is Allowed to Stand at High Temperatures

Each rechargeable lithium battery cell according to Examples 1 and 2 and Comparative Examples 1 to 3 was fully charged (state of charge (SOC)=100%) and allowed to stand for 10 days at 60° C. The cycle life of each rechargeable lithium battery cell was then evaluated. The result is provided in the following Table 2 and FIG. 2.

The cells were charged at constant current (CC) of 0.2 C up to 3.6V and discharged down to 2.8V during the first cycle and CC charged with a 0.2 C current up to 4.5V and discharged down 2.8V during the second cycle, which was their initial formation condition. As a result, an oxide film was formed on the surface of the positive electrode.

The initial capacity and the capacity after being allowed to stand for 10 days at 60° C. were measured by charging the cells at constant current and constant voltage (CC-CV) of 0.5 C up to 4.2V and then, discharging at 0.2 C to a cut off of 2.8V.

The capacity retention (%) was calculated as a percentage of discharge capacity after being allowed to stand for 10 days at 60° C. against initial capacity.

The resistance was measured as follows. The cells having a SOC of 50% were applied with 10 different discharge currents for 10 seconds and then voltage was measured. Their DC-IR values can be calculated from Equation 1 after acquiring a current value ($I_{max}$) at 2.1V from a current-voltage value. In particular, the 10 different discharge currents were 0.6 A, 1 A, 1.4 A, 1.6 A, 1.8 A, 2 A, 2.2 A, 2.4 A, 2.6 A, and 2.8 A.

$$DC\text{-}IR=(V_0-2.1V)/I_{max} \; (V_0=\text{initial voltage in SOC of 50\%}) \quad \text{Equation 1}$$

Then, the resistance increase (%) was calculated as a percentage of initial DC-IR. Specifically, the resistance increase is the ratio of the DC-IR after being allowed to stand for 10 days to the initial DC-IR.

TABLE 2

|  | Initial capacity (mAh) | Capacity after being allowed to stand for 10 days at 60° C. (mAh) | Capacity retention (%) | Resistance increase (%) |
|---|---|---|---|---|
| Example 1 | 91.51 | 79.08 | 86 | 10 |
| Example 2 | 90.04 | 79.79 | 89 | 11 |
| Comparative Example 1 | 90.5 | 75.90 | 84 | 9 |
| Comparative Example 2 | 89.38 | 73.74 | 83 | 10 |
| Comparative Example 3 | 88.79 | 74.96 | 84 | 9 |

Figure 2:
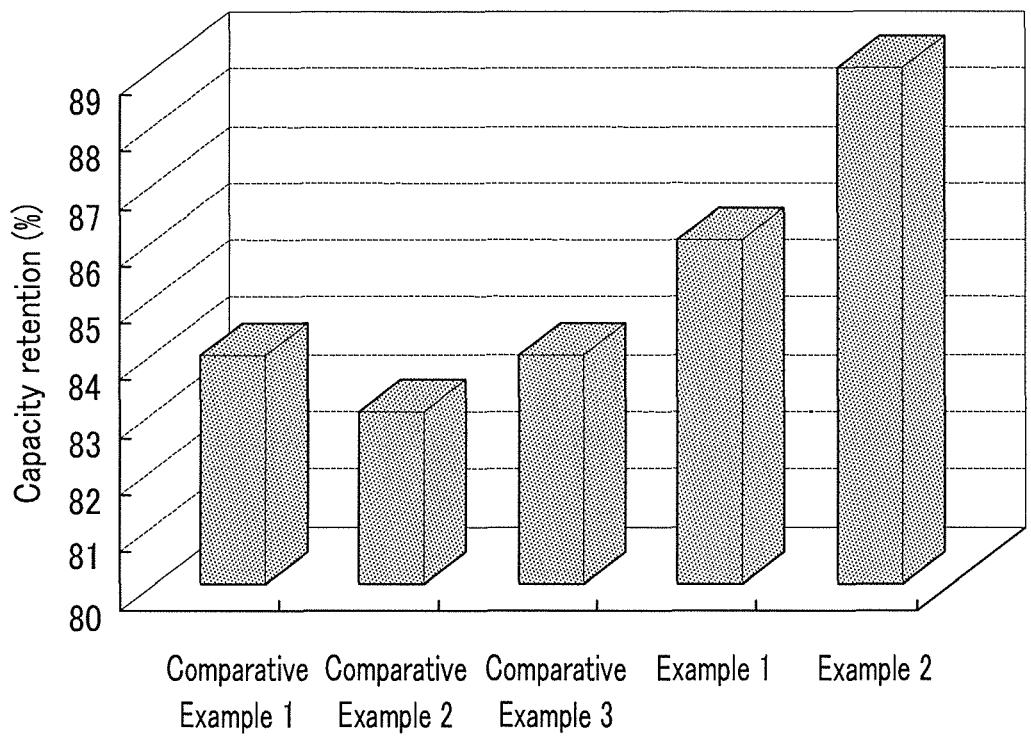
FIG. 2 is a graph showing the capacity retention of the rechargeable lithium batteries according to Examples 1 and 2 and Comparative Examples 1 to 3 after standing at high temperatures.

FIG. 2 is a graph comparing the capacity retention of the rechargeable lithium batteries according to Examples 1 and 2 and Comparative Examples 1 to 3 when allowed to stand at high temperatures. Referring to FIG. 2 and Table 2, the cells including the lithium salt and the additive according to Examples 1 and 2 had improved cycle-life after standing at high temperatures when compared with the cells according to Comparative Examples 1 to 3 that did not include the additive.

Experimental Example 2

Cycle-Life Evaluation During High Temperature Cycles

Each rechargeable lithium battery according to Examples 1 and 2 and Comparative Examples 1 to 3 was charged and discharged at 45° C. under a 1C/1C condition. Each rechargeable lithium battery was charged and discharged 100 times and capacity retention was measured to evaluate cycle-life at high temperatures. The results are provided in the following Table 3 and FIG. 3

TABLE 3

| | Initial capacity (mAh) | 100th capacity (mAh) | Capacity retention (%) |
|---|---|---|---|
| Example 1 | 90.11 | 81.11 | 90 |
| Example 2 | 89.41 | 81.68 | 91 |
| Comparative Example 1 | 88.46 | 78.41 | 89 |
| Comparative Example 2 | 88.80 | 80.03 | 90 |
| Comparative Example 3 | 88.35 | 79.00 | 89 |

Figure 3:
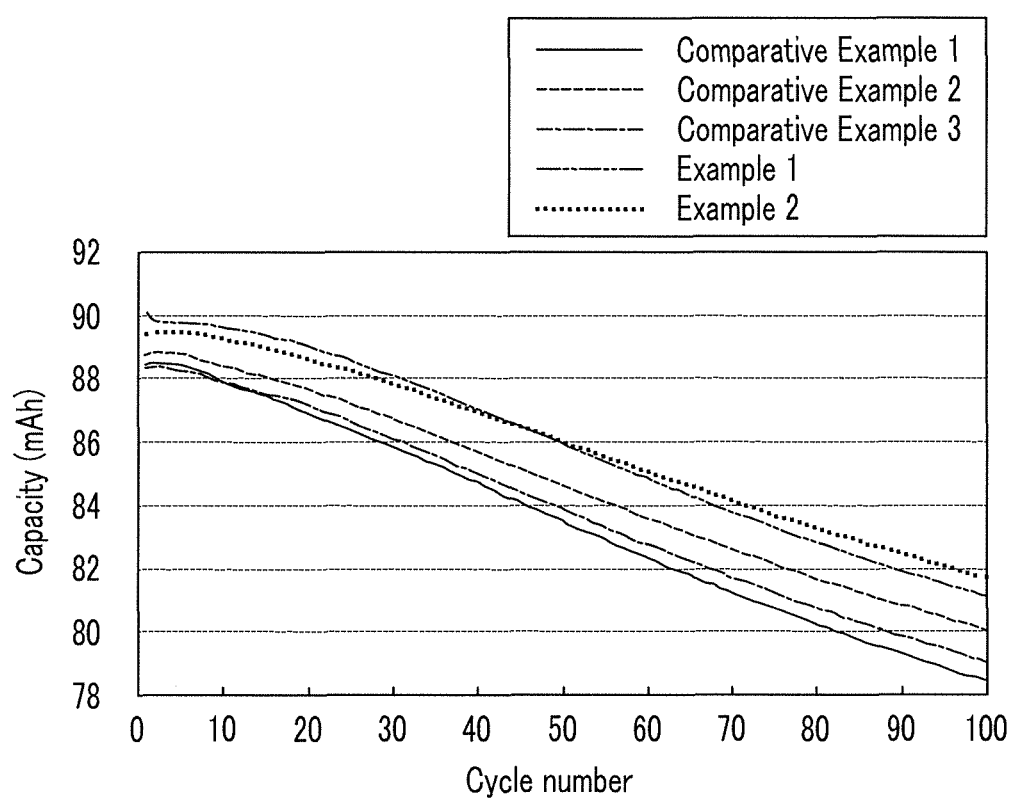
FIG. 3 is graph showing the capacity change of the rechargeable lithium batteries according to Examples 1 and 2 and Comparative Examples 1 to 3 when cycled at high temperatures.

FIG. 3 is a graph comparing the capacity change s in the rechargeable lithium batteries of Examples 1 and 2 and Comparative Examples 1 to 3 during cycling at high temperatures. Referring to FIG. 3 and Table 3, the cells including both a lithium salt and an additive according to Examples 1 and 2 had improved cycle-life during high temperature cycling when compared with the cells according to Comparative Examples 1 to 3 that did not include the additive.

While the present invention has been described in connection with certain exemplary embodiments, it is understood by those of ordinary skill in the art that certain modifications may be made to the described embodiments without departing from the spirit and scope of the present invention, as defined by the appended claims.

What is claimed is:

1. An electrolyte for a rechargeable lithium battery comprising:
a first lithium salt;
a second lithium salt comprising a compound selected from the group consisting of compounds represented by Chemical Formula 1, compounds represented by Chemical Formula 3-1, compounds represented by Chemical Formula 3-2, and combinations thereof;

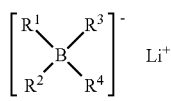

Chemical Formula 1 wherein in Chemical Formula 1,
$R^1$ and $R^2$ are optionally linked by a moiety represented by Chemical Formula 2 to form a ring,
when $R^1$ and $R^2$ are not linked by the moiety represented by Chemical Formula 2, each of $R^1$ and $R^2$ is F, and
$R^3$ and $R^4$ are linked by a moiety represented by Chemical Formula 2 to form a ring,

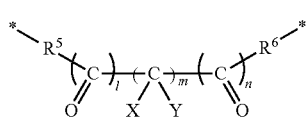

Chemical Formula 2 wherein in Chemical Formula 2,
each of $R^5$ and $R^6$ is independently O or S,
each of X and Y is independently H or F,
each of l and n is 0 or 1, and
m is an integer ranging from 0 to 5,

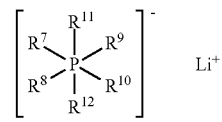

Chemical Formula 3-1 wherein in Chemical Formula 3-1,
$R^7$ and $R^8$ are optionally linked by a moiety represented by Chemical Formula 2 to form a ring,
when $R^7$ and $R^8$ are not linked by the moiety represented by Chemical Formula 2, each of $R^7$ and $R^8$ is F,
$R^9$ and $R^{10}$ are linked by a moiety represented by Chemical Formula 2 to form a ring, and
each of $R^{11}$ and $R^{12}$ is F,

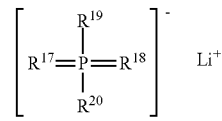

Chemical Formula 3-2 wherein in Chemical Formula 3-2,
each of $R^{17}$ and $R^{18}$ is independently selected from the group consisting of O, S and NR', wherein R' is selected from the group consisting of substituted C1 to C5 alkyl groups and unsubstituted C1 to C5 alkyl groups, and
each of $R^{19}$ and $R^{20}$ is F;
a non-aqueous organic solvent; and
an additive comprising a compound represented by Chemical Formula 9;

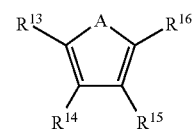

Chemical Formula 9 wherein in Chemical Formula 9,
A is selected from the group consisting of S, O, and NR", where R" is selected from the group consisting of H, substituted C1 to C20 alkyl groups, and unsubstituted C1 to C20 alkyl groups, and
each of $R^{13}$ to $R^{16}$ is independently selected from the group consisting of H, halogens, substituted C1 to C20 alkyl groups, unsubstituted C1 to C20 alkyl groups, substituted C1 to C20 alkoxy groups, and unsubstituted C1 to C20 alkoxy groups, wherein $R^{14}$ and $R^{15}$ may optionally be linked to each other to form a ring.

2. The electrolyte of claim 1, wherein the second lithium salt comprises a compound selected from the group consisting of compounds represented by Chemical Formulae 4 and 5:

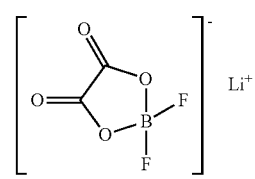

Chemical Formula 4

Chemical Formula 5

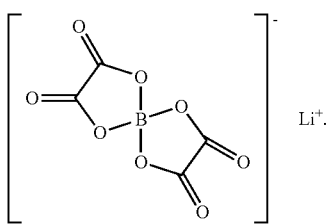

3. The electrolyte of claim 1, wherein the second lithium salt comprises a compound selected from the group consisting of compounds represented by Chemical Formulae 6 to 8:

Chemical Formula 6

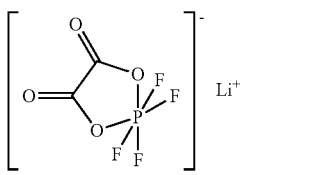

Chemical Formula 7

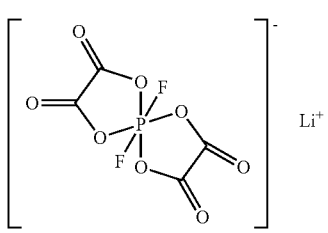

Chemical Formula 8

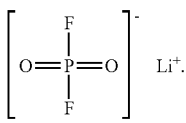

4. The electrolyte of claim 1, wherein the additive comprises a compound selected from the group consisting of compounds represented by Chemical Formulae 10 to 13:

Chemical Formula 10

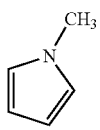

Chemical Formula 11

Chemical Formula 12

Chemical Formula 13

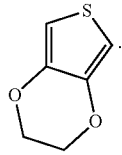

5. The electrolyte of claim 1, wherein the second lithium salt is present in an amount of about 0.1 to about 10 wt % based on the total weight of the electrolyte.

6. The electrolyte of claim 5, wherein the second lithium salt is present in an amount of about 0.5 to about 1.5 wt % based on the total weight of the electrolyte.

7. The electrolyte of claim 1, wherein a weight ratio of the first lithium salt to the second lithium salt is about 1:9 to about 9:1.

8. The electrolyte of claim 1, wherein the additive is present in amount of about 0.005 to about 3 wt % based on the total weight of the electrolyte.

9. The electrolyte of claim 8, wherein the additive is present in an amount of about 0.03 to about 0.1 wt % based on the total weight of the electrolyte.

10. The electrolyte of claim 1, wherein the first lithium salt comprises a material selected from the group consisting of $LiPF_6$, $LiBF_4$, $LiSbF_6$, $LiAsF_6$, $LiSO_3CF_3$, $LiN(CF_3SO_2)_2$, $LiN(C_2F_5SO_2)_2$, $LiClO_4$, $LiAlO_2$, $LiAlCl_4$, and combinations thereof.

11. The electrolyte of claim 1, wherein a weight ratio of the additive to the second lithium salt is about 0.005:1 to about 1:1.

12. A rechargeable lithium battery comprising:
   a positive electrode including a positive active material;
   a negative electrode including a negative active material; and
   the electrolyte of claim 1.

13. The lithium rechargeable battery of claim 12, wherein the positive active material comprises at least one lithium metal oxide selected from the group consisting of lithium metal oxides represented by Chemical Formulae 14 to 16:

$$Li_xMO_2 \qquad \text{Chemical Formula 14}$$

wherein M is at least one transition element, and $0 \leq x \leq 1$, $$Li_yM_2O_4 \qquad \text{Chemical Formula 15}$$

wherein M is at least one transition element, and $0 \leq y \leq 2$, $$x(Li_2MnO_3).(1-x)(LiMn_{2-y}M_yO_4) \qquad \text{Chemical Formula 16}$$

wherein M is at least one transition element, $0 < x < 1$, and $0 \leq y < 1$.

14. The lithium rechargeable battery of claim 12, wherein the negative active material comprises an active material selected from the group consisting of carbon-based active materials, Si-based active materials, and combinations thereof.

15. The lithium rechargeable battery of claim 12, wherein the second lithium salt comprises a compound selected from the group consisting of compounds represented by Chemical Formulae 4 and 5:

Chemical Formula 4

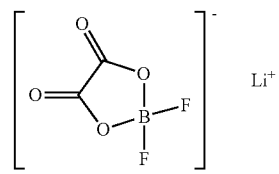

Chemical Formula 5

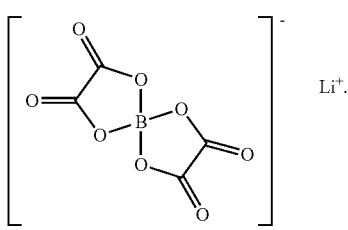

16. The lithium rechargeable battery of claim 12, wherein the second lithium salt comprises a compound selected from the group consisting of compounds represented by Chemical Formulae 6 to 8:

Chemical Formula 6

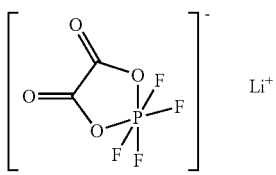

Chemical Formula 7

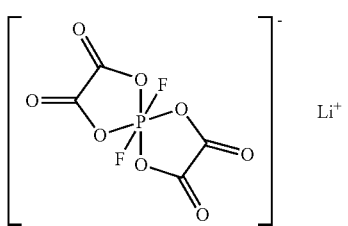

Chemical Formula 8

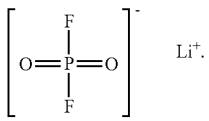

17. The lithium rechargeable battery of claim 12, wherein the additive comprises a compound selected from the group consisting of compounds represented by Chemical Formulae 10 to 13:

Chemical Formula 10

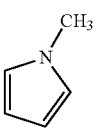

Chemical Formula 11

Chemical Formula 12

Chemical Formula 13

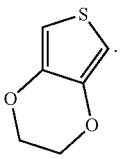

18. The lithium rechargeable battery of claim 12, wherein the second lithium salt is present in an amount of about 0.1 to about 10 wt % based on the total weight of the electrolyte.

19. The lithium rechargeable battery of claim 18, wherein the second lithium salt is present in an amount of about 0.5 to 1.5 wt % based on the total weight of the electrolyte.

20. The lithium rechargeable battery of claim 12, wherein the additive is present in an amount of about 0.005 to about 3 wt % based on the total weight of the electrolyte.

* * * * *